United States Patent [19]
Ogawa

[11] 3,873,682
[45] Mar. 25, 1975

[54] FILTER FOR URINE SAMPLES TO BE USED IN PREGNANCY TESTS AND METHOD OF USING SAME

[75] Inventor: Nobuhisa Ogawa, Omiya, Japan

[73] Assignee: Mochida Seiyaku Kabushiki Kaisha, Tokyo, Japan

[22] Filed: Feb. 14, 1972

[21] Appl. No.: 225,971

[30] Foreign Application Priority Data
Feb. 23, 1972  Japan.................................. 46-8537

[52] U.S. Cl........................ 424/12, 210/23, 210/25
[51] Int. Cl.......B01d 15.08, G01n 31/00, G01n 33/16
[58] Field of Search.......... 210/23, 65, 22, DIG. 23, 210/500, 24, 505, 25; 424/12, 2, 78, 81, 99, 100; 23/230 B, 230 M

[56] References Cited
UNITED STATES PATENTS

| | | | |
|---|---|---|---|
| 3,228,877 | 1/1966 | Mahon.................................. | 210/22 |
| 3,462,361 | 8/1969 | Greenwalt et al. ................... | 210/23 |
| 3,485,751 | 12/1969 | Herrmann et al..................... | 210/22 |
| 3,488,768 | 1/1970 | Rigopulos........................... | 210/23 |
| 3,593,854 | 7/1971 | Swank................................. | 210/23 |
| 3,616,930 | 11/1971 | Muir .............................. | 210/500 X |
| 3,674,865 | 7/1972 | Donini................................. | 424/99 |

*Primary Examiner*—Samih N. Zaharna
*Assistant Examiner*—F. F. Calvetti
*Attorney, Agent, or Firm*—Brisebois & Kruger

[57] ABSTRACT

Urine samples to be used in pregnancy are filtered through either cellulose acetate or polyacrylonitrile fibers.

2 Claims, 3 Drawing Figures

FILTER FOR URINE SAMPLES TO BE USED IN PREGNANCY TESTS AND METHOD OF USING SAME

The present invention relates to a method of filtering urine samples by means of cellulose acetate fibers and/or polyacrylonitrile synthetic fibers for highly reliable diagnosis of pregnancy, in a pregnancy diagnosis process utilizing the agglutination inhibition reaction of a latex or a erythrocyte with human chorionic gonadotropin (hereafter to be referred to as HCG) adsorbed thereon, and the agglutination reaction of a latex with an antibody to HCG as obtained through injection of HCG into an animal, adsorbed thereon.

It is well-known that the urine of a pregnant woman carries HCG secreted therein. Pregnancy has heretofore been diagnosed biologically by detection of the HCG reaction by using test animals such as mice, rats, rabbits and toads. Recently, however, the so-called immunological pregnancy diagnosis, in which HCG can be simply detected in a test tube or on a glass slide by an immunological process, has become more popular. This diagnosis is based on the principle that the anti-HCG which is formed in the blood of a rabbit or a guinea pig injected with HCG reacts sensitively and specifically to the HCG contained in the urine of a pregnant woman.

To be more specific, the agglutination reaction of a latex sensitized with anti-HCG (hereafter to be called the latex agglutination reaction) takes place when the urine sample is mixed with a polystyrene latex on which anti-HCG has been adsorbed. If HCG is present in the urine sample, the emulsion of fine latex particles will disintegrate and agglomerate into a visible mass. When this change is recognized on a glass slide, "pregnancy" is diagnosed.

Latex agglutination inhibition reaction, which is an indirect reaction to latex agglutination reaction, is also being utilitzed for diagnosis. Namely, the latex which has adsorbed HCG agglomerates when anti-HCG is added, but when anti-HCG which has been blended with a urine sample containing HCG is added to this latex, no agglutination of the latex occurs, because the anti-HCG has already combined with the HCG in the urine. Thus, when utilizing the latex agglutination inhibition reaction, non-agglutination indicates pregnancy.

Sensitized erythrocyte agglutination inhibition reaction (to be called hereafter the hemagglutination inhibition reaction) for pregnancy diagnosis is also practiced. This works on the same principle as the above-mentioned latex agglutination inhibition reaction, but instead of the above-mentioned latex, erythrocyte of a human or an animal which have adsorbed HCG are used.

As described above, this immunological diagnosis is simple in its working principle, but in practice the diagnosis may occasionally turn out to be erroneous in a very early stage of pregnancy which defies clinical determination, because in this stage the amount of HCG secreted in the urine is very small and accordingly the agglutination or its inhibition reaction is weak. Therefore it becomes necessary to prepare the latex or erythrocyte so that they can agglomerate in response to the slightest combination of HCG and anti-HCG. Fine particles of latex or erythrocyte are subtly affected by the slightest change in their dispersion system. For instance, when various electrolytic ions acids, alkalis, surface-active agents or water-soluble high polymers are added, agglomeration may be induced regardless of the HCG and anti-HCG reaction, or it may not occur at all.

Thus in the above-mentioned immunological method of examining the urine with a complex composition, the reaction may be disturbed by the contents of urine other than HCG and the diagnosis is often mistaken. All of the reaction-disturbing contents of urine have not yet been identified, but there are wide individual differences in their concentration. Particularly in the summer, when the urine tends to be concentrated, the rate of erroneous diagnosis is very high.

Apart from these disturbances, the urine may be turbid for other reasons. Such a turbid urine, if reacted as is, will lead to a wrong diagnosis. Therefore it is standard practice to use the urine for a reaction test only after filtering it by means of a filter paper or absorbent cotton.

As explained later, however, a common cellulose filter paper or absorbent cotton may be able to remove the turbidity, but at the same time it is likely to adsorb the HCG, too. Thus in the early stages of pregnancy when the secretion of HCG is small, the trace of HCG contained is further lessened by filtering and "non-pregnancy" may be erroneously diagnosed.

Under these circumstances, applicant has sought for a simple method of removing the turbidity and the reaction-disturbing substances without losing the trace of HCG carried in the urine. As a result he has succeeded in sufficiently removing both the turbidity and the reaction-disturbing substances in the urine and thereby drastically lowering the misdiagnosis rate, with an extremely small loss of HCG, by adopting as the filtering agent cellulose acetate fiber and/or polyacrylonitrile synthetic fiber. When the present invention is applied, it has the great advantage that, even using a urine sample containing only a trace HCG in the early stage of pregnancy, a reliable pregnancy diagnosis can be made; and even in the case of concentrated urine in summer, the diagnosis can be highly reliable.

A preferred method of carrying out the invention will now be described with reference to the accompanying drawings, in which.

Referring now to these drawings, a polyethylene tube 2 filled with a fiber mass 1, composed of either cellulose acetate fiber or polyacrylonitrile synthetic fiber or both, is attached to the tip of a pipette 3.

Figure 1:
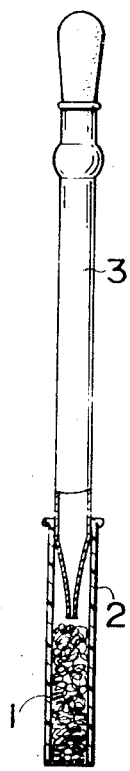
FIG. 1 shows a pipette with a polyethylene tube containing a fiber attached thereto.
Figure 2:
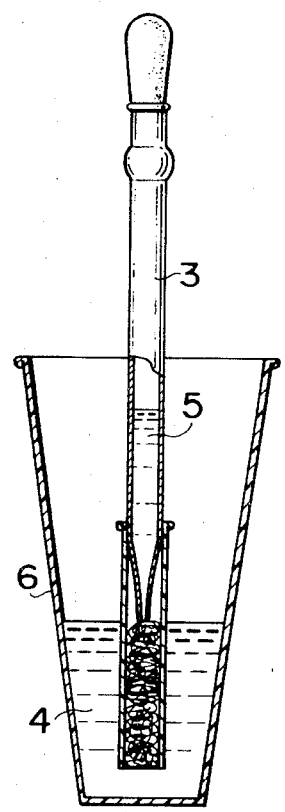
FIG. 2 shows the pipette and tube of FIG. 1 being dipped into a urine sample.
Figure 3:
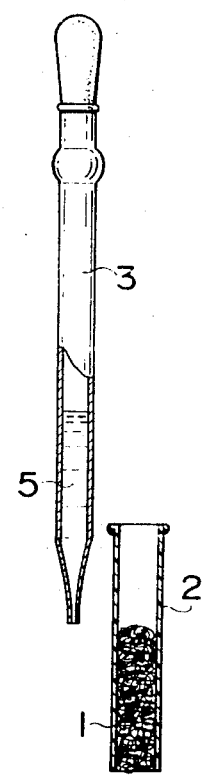
FIG. 3 shows the tube and pipette subsequently separated.

As indicated in FIG. 2, this pipette with said tube attached thereto is dipped into the urine sample 4 to suck up a certain amount of urine into the pipette 3. Thus a clear filtered urine 5 can be simply obtained. Then, as indicated in FIG. 3, the tube 2 is unfastened from the pipette and the filtered urine 5 in the pipette 3 can be immediately used for the test reaction.

Pregnancy can be diagnosed by latex agglutination reaction or latex agglutination inhibition reaction using a drop of this urine on a glass slide, or by hemagglutination inhibition reaction using 0.1 ml of it in a test tube. This filtering apparatus is simply one example of a simplified filter and the filtering method is by no means limited to this specific apparatus.

Test examples comparing the effect of pregnancy diagnosis with the filtering method according to the invention, using cellulose acetate fiber and/or polyacrylonitrile synthetic fiber, and the common filtering method using a filter paper or absorbent cotton, will now be given:

TEST EXAMPLE 1

A polyethylene tube having an inner diameter of 4.5 mm was filled with 50 mg each of cellulose acetate fiber, polyacrylonitrile synthetic fiber and absorbent cotton and, in accordance with the above-mentioned process, 0.3 ml of filtered urine was obtained. The filter paper employed was Toyo filter paper No. 5 B (5.5 cm diameter, 220 mg weight). After being folded four times, this paper was placed on top of a small funnel and 2 ml of urine was filtered through it.

In a preliminary test, 10 samples with notably heavy disturbance to the reaction were taken from non-pregnant women, while 10 samples with a trace of HCG (less than 3 international units/ml) were taken from pregnant women. In accordance with the above-mentioned process, these samples were filtered, subjected to latex agglutination reaction and hemagglutination inhibition reaction, and the results were compared. At the same time a non-filtered urine was tested as a control. The results are summarized in Tables 1 and 2.

In the case of the non-pregnant women's urine, when reacted without filtering, two cases out of ten exhibited definitely "positive" results, while five cases exhibited "doubtful-positive", i.e., intermediate between "negative" and "positive" results.

As for the hemagglutination inhibition reaction two cases turned out "doubtful-positive". Thus, the influence of reaction-disturbing substances which cause misdiagnosis is notably prominent in the latex agglutination reaction, but when a filtered urine is employed, these substances are removed and the judgment correctly turns out "negative", whatever process is used for filtering.

TABLE 1

Comparison of filtering methods as applied to non-pregnant urine.

| Non-pregnant urine samples No. | 1 2 3 4 5 6 7 8 9 10 |
|---|---|
| Latex agglutination reaction | |
| Not filtered | ± − + + − ± ± ± − ± |
| Filtered through absorbent cotton | − − − − − − − − − − |
| Filtered through filter paper | − − − − − − − − − − |
| Filtered through polyacrylonitrile fiber | − − − − − − − − − − |
| Filtered through cellulose acetate fiber | − − − − − − − − − − |
| Hemagglutination inhibition reaction | |
| Not filtered | − − ± ± − − − − − − |
| Filtered through absorbent cotton | − − − − − − − − − − |
| Filtered through filter paper | − − − − − − − − − − |
| Filtered through polyacrylonitrile fiber | − − − − − − − − − − |

TABLE 1-Continued

Comparison of filtering methods as applied to non-pregnant urine.

| Non-pregnant urine samples No. | 1 2 3 4 5 6 7 8 9 10 |
|---|---|
| Filtered through cellulose acetate fiber | − − − − − − − − − − |

TABLE 2

Comparison of filtering methods as applied to pregnant urine.

| Pregnant urine samples No. | 1 2 3 4 5 6 7 8 9 10 |
|---|---|
| Latex agglutination reaction | |
| Not filtered | + + + + + + + + + + |
| Filtered through absorbent cotton | − − + ± + − ± + − − |
| Filtered through filter paper | − − + ± + − + + − + |
| Filtered through polyacrylonitrile fiber | + + + + + + + + ± + |
| Filtered through cellulose acetate fiber | + + + + + + + + ± + |
| Hemagglutination inhibition reaction | |
| Not filtered | + + + + + + + + + + |
| Filtered through absorbent cotton | − − + ± + − ± + − ± |
| Filtered through filter paper | − − + ± + − + + − + |
| Filtered through polyacrylonitrile fiber | + + + + + + + + ± + |
| Filtered through cellulose acetate fiber | + + + + + + + + ± + |

In the case of pregnant women's urine containing a little HCG, all cases turned out "positive" both in the latex agglutination and in the hemagglutination inhibition reaction, when as shown in Table 2, the urine was not filtered. When, however, it was filtered through a filter paper and absorbent cotton, the reaction was very much weakened and in five cases out of 10 the latex agglutination reaction was "negative", while in four cases out of ten the hemagglutination inhibition reaction was negative, showing that pregnancy may be misdiagnosed to be non-pregnancy. By contrast, when the urine was filtered through polyacrylonitrile synthetic fiber or cellulose acetate fiber in accordance with the present invention, no case turned out negative and only a single case appeared doubtful-positive.

Thus the reactions of unfiltered urine are liable to turn out positive, even though the urine is actually negative, with a possibility of mistaking non-pregnancy for pregnancy. If the conventional filter paper or absorbent cotton is employed, such a mistake may be avoided, but there will then be a high possibility of mistaking pregnancy for non-pregnancy when the HCG content in the urine is very small. The use of polyacrylonitrile fiber or cellulose acetate fiber as the filtering means will enable both sufficient removal of reaction-disturbing substances and, with little adsorption of HCG, substantial reduction of the misdiagnosis rate.

Next, the following test was made for quantitative comparison of HCG adsorption by different means for filtering.

TEST EXAMPLE 2

In five urine samples taken from healthy, non-pregnant women, HCG was dissolved in the amount of four international units/ml. These samples were filtered under absolutely the same conditions as in Test Example 1. The residual HCG in the filtrate was measured by L. Wide's quantitative hemagglutination inhibition method (Acta Endoc. Suppl. 70 (1962).

As indicated in Table 3, HCG adsorptions by different filtering means somewhat vary from sample to sample, but the original four international units/ml before filtering diminished to 1.0 - 2.5 international units/ml after filtering through absorbent cotton and to 2.0 - 2.5 international units/ml after filtering through paper. In contrast to this, when filtered through polyacrylonitrile and cellulose acetate fiber in accordance with the present invention it diminished to 3.5 - 3.75 international units/ml, which clearly shows a very low HCG adsorption. These tests show that in the ten cases of pregnant urine tests showing reduction of HCG to about three international units/ml the effectiveness of the present invention is so great that even the samples with trace HCG can be correctly determined to be positive.

TABLE 3

Residual HCG in the filtrate of urine containing four international units of HCG per ml (international unit/ml)

| Urine Sample No. | 1 | 2 | 3 | 4 | 5 |
|---|---|---|---|---|---|
| Filter | | | | | |
| Absorbent cotton | 1.0 | 2.5 | 1.5 | 1.0 | 2.0 |
| Paper | 2.0 | 2.5 | 2.0 | 2.0 | 2.25 |
| Polyacrylonitrile | 3.5 | 3.75 | 3.5 | 3.75 | 3.75 |
| Cellulose acetate | 3.75 | 3.75 | 3.5 | 3.5 | 3.75 |

TEST EXAMPLE 3

The following test was performed to investigate the relationship between the volume of filter material and the yield of filtered urine. Using 50 mg, 75 mg and 100 mg of polyacrylonitrile synthetic fiber and cellulose acetate fiber, utilizing the method hereinbefore described, and 0.3 ml, 0.5 ml and 1.0 ml of filtrate, 20 samples of pregnant urine and 20 samples of non-pregnant urine were subjected to a reactivity test in latex agglutination and hemagglutination inhibition reactions. In all cases the non-pregnant urine had its reaction-disturbing substances completely removed and turned out negative, but among the twenty cases of pregnant urine using 50 mg of polyacrylonitrile synthetic fiber and filtering 1.0 ml, only one case turned out doubtful-positive and the rest turned out positive. This shows that, in practice, a wide range of combinations between the volume of filtering means and the yield of filtered urine are available for obtaining the necessary quantity of filtered urine for immunological pregnancy diagnosis.

Some examples of the present invention are cited below.

EXAMPLE 1

Seventy-eight samples of non-pregnant urine were filtered in accordance with the process schematically illustrated, using a polyethylene filter tube having an inner diameter of 4.5 mm filled with 50 mg each of polyacrylonitrile synthetic fiber and cellulose acetate fiber according to the present invention, thereby yielding 0.3 ml of filter urine. Using a drop of this filtered urine a latex agglutination test on a glass slide was performed; and using 0.1 ml of it in a test tube, hemagglutination inhibition test was performed. The results showed that all cases were negative and no case was doubtful-positive. In this example, the critical concentration for HCG detection of the reagent adopted in both reactions was 1.0 international unit/ml and this value is sufficient for detecting the trace HCG in the early stage of pregnancy.

When the sample urine used here described in the preceding paragraph reacted without filtering, in 16 out of 78 cases the latex agglutination turned out positive; in 24 it turned out doubtful-positve and only in 38 did it correctly turn out negative. In the hemagglutination inhibition test, two cases turned out doubtful-positive.

EXAMPLE 2

Using a polyethylene tube having an inner diameter of 4.5 mm filled with 50 mg each of polyacrylonitrile synthetic fiber or cellulose acetate fiber and using the method illustrated, 193 urine samples of women diagnosed for pregnancy were filtered to yield 0.3 ml of filtered urine each. This filtered urine was submitted to latex agglutination and hemagglutination inhibition tests. Similar reactions were made using a filter tube filled with 50 mg of absorbent cotton in accordance with the traditional method. Using these three kinds of filtering material, the results of evaluation of filtered urine were compared.

Table 4 summarizes these results. In 182 cases the correct judgment was pregnant and in 11 cases it was non-pregnant. When filtered through absorbent cotton, 18 cases using hemagglutination inhibition and 21 cases using latex agglutination were judged non-pregnant. Contray to this, when filtered through the two filtering means according to the present invention, 11 cases in both reactions were judged non-pregnant, which agrees with the number of correct judgments. When using filter material according to the present invention, only two or three cases exhibited doubtful-positive reaction with the urine in the early stage of pregnancy. This is fewer than the seven cases of doubtful-positiveness encountered with filtering through absorbent cotton.

TABLE 4

Results of evaluation of 193 women diagnosed for pregnancy

| Reaction | | | |
|---|---|---|---|
| Filter | Evaluation | | |
| | Positive | Pseudo-positive | Negative |
| Hemagglutination Inhibition | | | |
| Absorbent cotton | 168 | 7 | 18 |
| Polyacrylonitrile | 180 | 2 | 11 |
| Cellulose acetate | 179 | 3 | 11 |
| Latex agglutination reaction | | | |
| Absorbent cotton | 165 | 7 | 21 |

TABLE 4-Continued

Results of evaluation of 193 women diagnosed for pregnancy

| Reaction Filter | Evaluation | | |
|---|---|---|---|
| | Positive | Pseudo-positive | Negative |
| Polyacrylo-nitrile | 179 | 3 | 11 |
| Cellulose acetate | 180 | 2 | 11 |
| correct diagnosis | "pregnant" 182 "non-pregnant" 11 | | |

What is claimed is:

1. Method of filtering a urine sample preparatory to the immunological detection of human gonadotropin in said urine, which method comprises the step of filtering said urine through a fibrous mass consisting essentially of fibers selected from the group consisting of cellulose acetate fibers and polyacrylonitrile synthetic fibers which selectively adsorb a substantial proportion of those components in said urine which tend to interfere with the exact measurement of the gonadotropin content, without materially reducing the gonadotropin content of said sample.

2. Method of determining pregnancy from a urine sample, which method comprises the step of first filtering said urine sample through a fibrous mass consisting essentially of fibers selected from the group consisting of cellulose acetate fibers and polyacrylonitrile synthetic fibers which selectively adsorb a substantial proportion of those components in said urine which tend to interfere with the exact measurement of the gonadotropin content, without materially reducing the gonadotropin content of said sample, and then subjecting said urine sample to an immunological test for the presence of human gonadotropin.

* * * * *

UNITED STATES PATENT OFFICE
CERTIFICATE OF CORRECTION

PATENT NO. : 3,873,682
DATED : March 25, 1975
INVENTOR(S) : NOBUHISA OGAWA

It is certified that error appears in the above-identified patent and that said Letters Patent are hereby corrected as shown below:

[30]   Foreign Application Priority Data

Feb. 23, 1971   Japan ........46-8537

Signed and Sealed this

*twenty-eight* Day of *October 1975*

[SEAL]

*Attest:*

RUTH C. MASON
*Attesting Officer*

C. MARSHALL DANN
*Commissioner of Patents and Trademarks*